US012763571B2

(12) United States Patent
Taniguchi et al.

(10) Patent No.: US 12,763,571 B2
(45) Date of Patent: Oct. 13, 2026

(54) POWER SUPPLY EQUIPPED WITH BATTERY UNIT

(71) Applicant: Panasonic Energy Co., Ltd., Osaka (JP)

(72) Inventors: Keitaro Taniguchi, Hyogo (JP); Junpei Ito, Tokyo (JP); Atsushi Suyama, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 636 days.

(21) Appl. No.: 18/546,954

(22) PCT Filed: Feb. 22, 2022

(86) PCT No.: PCT/JP2022/007201
§ 371 (c)(1),
(2) Date: Aug. 17, 2023

(87) PCT Pub. No.: WO2022/181600
PCT Pub. Date: Sep. 1, 2022

(65) Prior Publication Data

US 2024/0136808 A1 Apr. 25, 2024
US 2024/0235182 A9 Jul. 11, 2024

(30) Foreign Application Priority Data

Feb. 24, 2021 (JP) ................................ 2021-027673

(51) Int. Cl.
*H02J 7/00* (2026.01)
*H01H 9/54* (2006.01)
(Continued)

(52) U.S. Cl.
CPC ................ *H02H 7/18* (2013.01); *H01H 9/54* (2013.01); *H01H 37/761* (2013.01);
(Continued)

(58) Field of Classification Search
USPC .......................................................... 320/134
See application file for complete search history.

(56) References Cited

U.S. PATENT DOCUMENTS 6,992,463 B2 * 1/2006 Yoshio .................... H02J 7/663
320/136
2011/0273137 A1 * 11/2011 Nakatsuji ............. H01M 10/42
361/86

FOREIGN PATENT DOCUMENTS

JP 2019-208319 12/2019

OTHER PUBLICATIONS

International Search Report of PCT application No. PCT/JP2022/007201 dated Apr. 19, 2022.

* cited by examiner

*Primary Examiner* — Samuel Berhanu
(74) *Attorney, Agent, or Firm* — WHDA, LLP

(57) ABSTRACT

A fuse element of a SCP is reliably fusion-cut with a simple circuit configuration to interrupt an electric current. In a power supply equipped with a battery unit, a control circuit (7) is configured to control turning on and off of a switch (6) configured to connect the SCP (3) which is connected in series to a battery unit (1) and is configured to interrupt charge and discharge currents in an abnormal state. Battery unit 1 includes battery cells (2) connected in series to one another. The SCP (3) includes fuse element 4 connected in series to an output end of the battery unit (1), and a heater (5) configured to fusion-cut the fuse element (4). The switch (6) includes switching elements (10) each of which has one terminal connected to the heater (5) and another terminal connected to a corresponding one of different-voltage terminals (11) of the battery unit 1. In control circuit (7), a selection circuit (9) is configured to select, according to the voltage detected by the voltage detection circuit (8), a
(Continued)

switching element (10) to be turned on, and the switching element (10) which is turned on connects the battery unit (1) to the heater (5) to fusion-cut the fuse element (4).

7 Claims, 1 Drawing Sheet

(51) Int. Cl.

| | |
|---|---|
| ***H01H 37/76*** | (2006.01) |
| ***H01M 10/48*** | (2006.01) |
| ***H02H 7/18*** | (2006.01) |
| ***H02J 7/60*** | (2026.01) |
| ***H02J 7/61*** | (2026.01) |

(52) U.S. Cl.

CPC ............... *H01M 10/48* (2013.01); *H02J 7/61* (2026.01); *H02J 7/663* (2026.01)

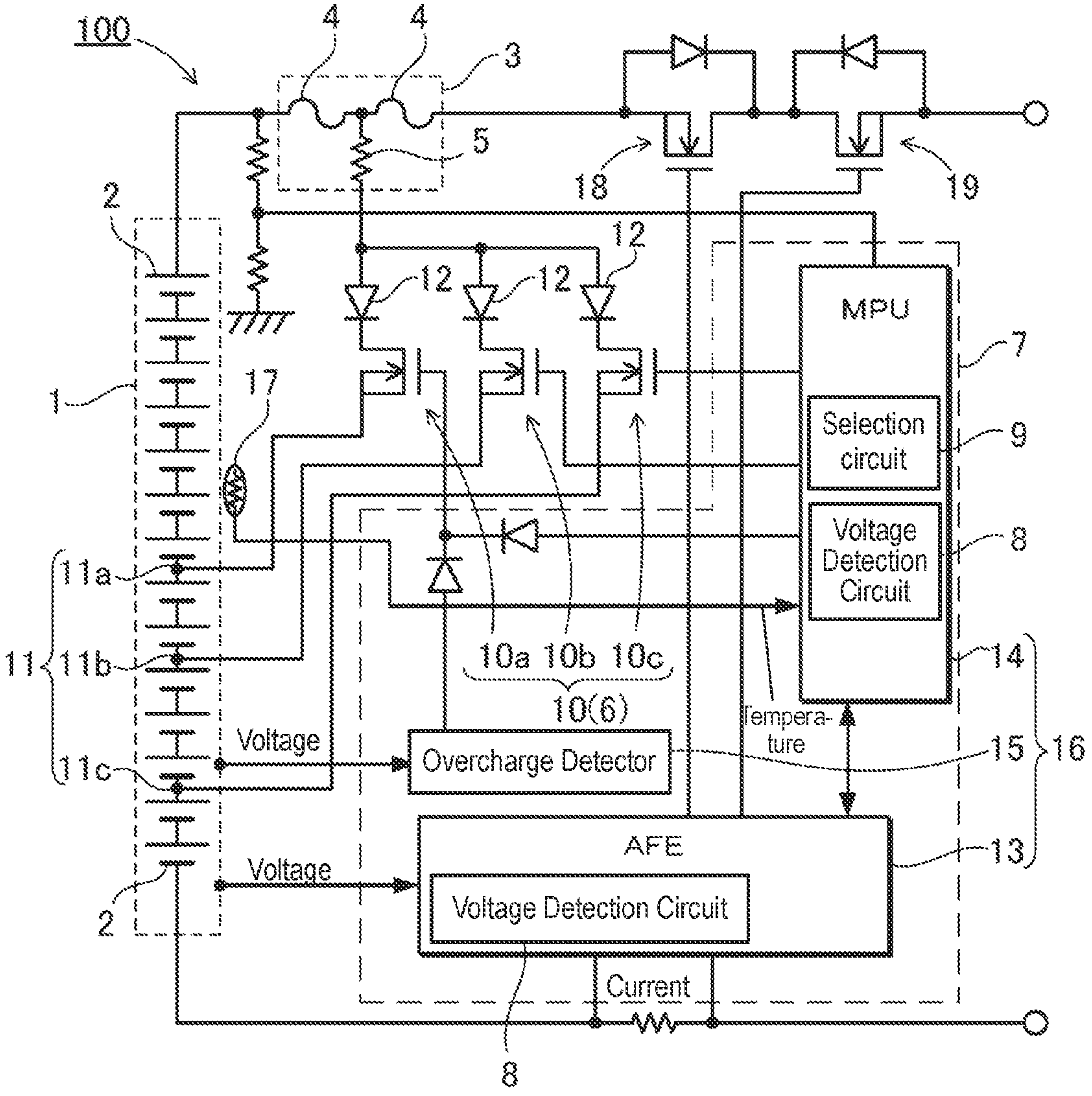
100
4
4
3
5
18
19
2
12
12
12
MPU
7
1
17
Selection circuit
9
Voltage Detection Circuit
8
11a
11
11b
10a 10b 10c
14
10(6)
Tempera-ture
Voltage
Overcharge Detector
15
16
11c
AFE
13
Voltage
Voltage Detection Circuit
2
Current
8

POWER SUPPLY EQUIPPED WITH BATTERY UNIT

TECHNICAL FIELD

The present invention relates to a power supply including a battery unit and a self-control protector (SCP) connected in series to the battery unit.

BACKGROUND ART

A power supply equipped with a battery unit includes a SCP connected to an output end of the power supply so that an electric current is interrupted at the SCP in the event of malfunction. The SCP includes a fuse element connected in series to the battery unit and a heater configured to heat and fusion-cut the fuse element by Joule heating. The heater is disposed close to and thermally coupled to the fuse element, is connected to the battery unit via a switch, and is configured to generate heat by Joule heating. The switch is turned on in the event of malfunction on the battery end, a load end, or the like. The switch which is turned on supplies electric power from the battery unit to the heater and causes the heater to generate heat. The heater generates heat with the electric power supplied from the battery unit. Upon being small, the electric power supplied from the battery unit to the heater may cause the amount of heat generated by Joule heating of the heater to be too small to heat the fuse element up to its fusing temperature, hardly fusion-cutting the fuse element. On the other hand, upon being excessively large, the electric power supplied from the battery unit to the heater burns out the fuse element, being prevented from heating and fusion-cutting the fuse element. In order to reliably fusion-cut the fuse element and interrupt the electric current output by adjusting the electric power to be supplied to the heater within a predetermined range in the event of malfunction, this power supply is required to adjust the electric power to be supplied from the battery unit to the heater within the predetermined range.

The voltage of a battery unit including battery cells connected in series to one another changes such that the voltage increases upon the battery unit being charged, the voltage increases, and when the voltage decreases upon the battery unit being discharged. In particular, the voltage of a lithium-ion secondary battery, which is widely used in various applications due to its high charge and discharge capacity, changes largely according to a remaining capacity. That is, a voltage of a fully-charged battery unit with a 100% remaining capacity is significantly different from a voltage of the battery unit discharged to almost 0% of the remaining capacity, thus proving a negative effect that power supplied from the battery unit connected to the heater changes largely.

A SCP (SFK-5045x) in which the operating voltage of a heater that fusion-cuts a fuse element ranging, e.g., from 43.7 V to 62 Vis commercially available. In the case that this SCP is connected to a battery unit including 14 battery cells connected in series to one another and a voltage is supplied from the battery unit to the heater, voltages of the battery cells corresponding to the operating voltage range of the heater ranges from 3.15 V to 4.35 V. If the voltage of the cells of the battery unit is below 3.15 V, no fusion-cutting occurs in the SCP. When the cell voltage drops to 3 V or less, charging and discharging the battery pack cannot be stopped by fusion-cutting in the SCP.

In order to control this negative effect, a power supply that supplies electric power from a battery unit to a heater via a constant current circuit has been developed (PTL 1).

CITATION LIST

Patent Literature

PTL 1: Japanese Patent Laid-Open Publication No. 2019-208319

SUMMARY OF INVENTION

Technical Problem

In a power supply that supplies electric power from a battery unit to a heater of a SCP via a constant current circuit, the heater generates heat with constant electric currents regardless of a change in the voltage of the battery unit. Therefore, even when the voltage of the battery unit changes, the heater generates a constant amount of heat. This is because Joule heating that causes the heater to generate heat is defined by the product of the square of an electric current and the electrical resistance of the heater. Thus, the power supply that energizes the heater from the battery unit via the constant current circuit can heat the heater in a favorable state and fusion-cut a fuse element. However, since the constant current circuit maintains an output voltage at a constant value by reducing the voltage of the battery unit through a voltage drop of an internal resistor in a semiconductor device, a circuit that reduces the voltage, for example, the internal resistor in the semiconductor device such as a transistor or a field-effect transistor (FET), generates heat by Joule heating. The heat generated by the semiconductor device increases in proportion to the product of the square of an electric current and the internal resistance; in a general SCP, the heater current required to fusion-cut a fuse element is as high as approximately several amperes and furthermore, the voltage of a battery unit is reduced due to the internal resistor, resulting in a constant current circuit having the disadvantage of having a large circuit size and moreover a complicated circuit configuration, in consideration of heat generation even during a short drive until the fuse element is fusion-cut.

The present invention is developed with an aim of eliminating this advantage, and a primary object of the present invention is to provide a power supply equipped with a battery unit that is capable of interrupting an electric current by reliably fusion-cutting a fuse element of a SCP with a simple circuit configuration.

Solution to Problem

A power supply equipped with a battery unit according to an aspect of the present invention includes: a battery unit; a self-control protector (SCP) connected in series to the battery unit, the SCP being configured to interrupt charge and discharge currents in an abnormal state; a switch configured to connect the SCP to the battery unit; and a control circuit configured to control turning on and off of the switch. The battery unit includes battery cells connected in series to one another. The SCP includes: a fuse element connected in series to an output end of the battery unit; and a heater connected to the battery unit. The heater is configured to generate heat by Joule heating to fusion-cut the fuse element. The switch includes switching elements, each of the plurality of switching elements having one terminal connected to the heater and another terminal connected to a corresponding one of different-voltage terminals of the battery unit, the different-voltage terminals having different voltages appearing thereon. The control circuit includes: a voltage detection circuit configured to detect a voltage of the battery unit or one of the plurality of battery cells; and a selection circuit configured to select, according to the voltage detected by the voltage detection circuit, a switching element out of the plurality of switching elements which is to be turned on. The selection circuit is configured to, in the abnormal state: select the switching element to be turned on: and connect the switching element which is turned on to connect the battery unit to the heater cause so as to fusion-cut the fuse element.

Advantageous Effects of Invention

The above-described power supply equipped with the battery unit is capable of interrupting an electric current by reliably fusion-cutting the fuse element of the SCP with a simple circuit configuration.

BRIEF DESCRIPTION OF DRAWINGS

FIG. 1 is a schematic configuration diagram of a power supply equipped with a battery unit according to an exemplary embodiment of the present invention.

DESCRIPTION OF EMBODIMENTS

A power supply equipped with a battery unit according to an aspect of the present invention includes: a battery unit; a self-control protector (SCP) connected in series to the battery unit, the SCP being configured to interrupt charge and discharge currents in an abnormal state; a switch configured to connect the SCP to the battery unit; and a control circuit configured to control turning on and off of the switch. The battery unit includes a plurality of battery cells connected in series to one another. The SCP includes: a fuse element connected in series to an output end of the battery unit; and a heater connected to the battery unit, the heater being configured to generate heat by Joule heating to fusion-cut the fuse element. The switch includes switching elements, each of which having one terminal connected to the heater and another terminal connected to a corresponding one of different-voltage terminals of the battery unit, the different-voltage terminals having different voltages appearing thereon. The control circuit includes: a voltage detection circuit configured to detect a voltage of the battery unit or one of the plurality of battery cells; and a selection circuit configured to select, according to the voltage detected by the voltage detection circuit, a switching element out of the plurality of switching elements which is to be turned on. The selection circuit is configured to, in the abnormal state: select the switching element to be turned on: and connect the switching element which is turned on to connect the battery unit to the heater cause so as to fusion-cut the fuse element.

In the power supply described thus, a different-voltage terminal that connects the heater to the battery unit is selected according to a change in the voltage of the battery unit, the battery cell. Even in a state where the voltage of the battery unit, the battery cell, or the like changes, the voltage to be supplied from the battery unit to the heater may adjusted within a predetermined range, and the battery unit heats the heater to reliably fusion-cut the fuse element. In the battery unit, the battery cells are connected in series to one another; thus, the voltage at a connection point at which the battery cells are connected in series is an integral multiple of the cell voltage from the negative to the positive end of the battery unit. The cell voltage changes according to the remaining capacity and therefore is not constant, and the voltage of the different-voltage terminal gradually increases from a connection point at the negative end to a connection point at the positive end. For example, in the case of a battery unit including 10 battery cells connected in series, the total voltage is 10 times greater than the cell voltage, and the voltage of the different-voltage terminal at an intermediate connection point is five times greater than the cell voltage. In this configuration, the same voltage may supplied to the heater by supplying the total voltage of the battery unit to the heater via the switching elements in a state where the cell voltage drops to a half of the maximum voltage, and energizing the heater via the switching element connected to the different-voltage terminal at the intermediate connection point in a state where the cell voltage rises up to the maximum voltage.

For example, using a SCP (SFK 3045x) in which the operating voltage of a heater that fusion-cut a fuse element ranges from 22.3 V to 31.5 V, the power supply described may select first to third switching elements to be turned on so as to supply a voltage to the heater from seven battery cells connected in series, nine battery cells connected in series, and 12 battery cells connected in series as a battery cell voltage, thereby setting the operating voltage of the heater to the aforementioned range, and thus fusion-cut the fuse element.

The first switching element supplies a voltage to the heater from the seven battery cells connected in series when the cell voltage ranges from 3.2 V to 4.35 V. This cell voltage provides the voltage supplied to the heater ranging from 22.4 V to 30.45 V.

The second switching element supplies a voltage to the heater from the nine battery cells connected in series when the cell voltage ranges from 2.5 V to 3.5 V. This cell voltage provides the voltage supplied to the heater ranging from 22.5 V to 31.5 V.

The third switching element supplies a voltage to the heater from the 12 battery cells connected in series when the cell voltage ranges from 1.9 V to 2.6 V. This cell voltage provides the voltage supplied to the heater ranging from 22.8 V to 31.2 V.

In the power supply described, a voltage is supplied from the battery unit to the heater of the SCP via the first to third switching elements. In the power supply device including four switching elements, a fourth switching element may supply a voltage to the heater from 14 battery cells connected in series when the cell voltage drops to a voltage ranging from 1.6 V to 2.2 V, adjust the voltage to be supplied to the heater with a range from 22.4 V to 30.8 V, and thus set the voltage of the heater to an operating voltage.

In a power supply equipped with the battery unit according to another aspect of the present invention, the control circuit includes a detector configured to detect the abnormal state, the control circuit being configured to turn on the switching element to fusion-cut the fuse element when the detector detects the abnormal state.

In a power supply equipped with the battery unit according to still another aspect of the present invention, the detector includes: an analog front end (AFE) configured to detect voltages of the plurality of battery cells; and a microprocessor unit (MPU) configured to detect a total voltage of the battery unit. The detector is configured to determine an abnormality by comparing, with threshold values, the voltages of the plurality of battery cells detected by the AFE and the total voltage of the battery unit detected by the MPU.

A power supply equipped with the battery unit according to still another aspect of the present invention, the detector includes an overcharge detector configured to detect overcharging of the battery unit. The overcharge detector is configured to detect the overcharging of the battery unit to fusion-cut the fuse element of the SCP.

The power supply described fusion-cuts the fuse element of the SCP by directly controlling the switching element using the overcharge detector and thus has an advantage preventing overcharging by reliably stopping charging and discharging of the battery unit when the voltage detection circuit of the control circuit malfunctions.

In a power supply equipped with the battery unit according to still another aspect of the present invention, claims 2 to 4, wherein the detector is configured to: detect a temperature of the battery unit or the plurality of battery cells; and determine the abnormal state by comparing the temperature detected with a threshold value.

In a power supply equipped with the battery unit according to still another aspect of the present invention, diodes each of which is connected in series to a corresponding one of the switching elements in a direction in which a current flowing in the corresponding one of the switching elements.

The power supply provides an advantage reliably fusion-cutting the fuse element of the SCP by providing control to turn on two or more switching elements together. This is because a voltage is supplied from only a switching element out of the simultaneously-turned-on switching elements to which the highest voltage is supplied elements. This power supply provides an advantage reliably fusion-cutting the fuse element of the SCP by turning on two or more switching elements in a border range of the cell voltage for selecting each switching element.

In the power supply equipped with the battery unit according to still another aspect of the present invention, the switching elements are field-effect transistors (FETs).

Hereinafter, the present invention will be described in detail with reference to the drawings. Note that in the following description, terms indicating specific directions and positions (for example, "upper", "lower", and another term including these terms) are used as required; however, these terms are used to facilitate the understanding of the invention with reference to the drawings, and the technical scope of the present invention is not restricted by the meanings of these terms. Furthermore, parts denoted by the same reference signs indicated on more than one FIGURE represent the same or substantially the same parts or members.

Furthermore, the exemplary embodiments described below indicate specific examples of the technical idea of the present invention, and the present invention is not limited to the following. Moreover, the dimensions, materials, shapes, relative positioning, and the like of components indicated below are not intended to limit the scope of the present invention to those indicated, but are merely illustrative, unless otherwise specified. In addition, the disclosure described in one exemplary embodiment and one example can be applied to another exemplary embodiment and another example. There are also cases where the size, positional relationship, and the like of the members illustrated in the drawings are exaggerated for clarity of explanation.

Exemplary Embodiment 1

Power supply 100 illustrated in FIG. 1 includes: battery unit 1; self-control protector (SCP) 3 connected in series to an output end of battery unit 1 and configured to interrupt charge and discharge currents in an abnormal state of battery unit 1, a load, or the like; switch 6 configured to connect SCP 3 to battery unit 1 and to supply electric power to heater 5 of SCP 3 using electric power from battery unit 1 to fusion-cut fuse element 4; and control circuit 7 configured to control turning on and off of switch 6 in the abnormal state.

Battery Unit 1

Battery unit 1 includes a plurality of battery cells 2 connected to each other in series. A non-aqueous electrolyte secondary battery such as a lithium-ion secondary battery having a high charge and discharge capacity is suitable for battery cell 2. Note that in the present invention, the battery cell is not limited to the lithium-ion secondary battery; every secondary battery that is being currently used or will be developed in the future, for example, a nickel-hydrogen battery or an all-solid-state battery, can also be used as the battery cell.

Battery unit 1 includes battery cells 2 connected in series to one another to provide a high output voltage. In battery unit 1, voltages at intermediate connection points at which battery cells 2 are connected in series increases step by step. For example, in battery unit 1 including battery cells 2 that are lithium-ion secondary batteries with a rated voltage of 3.7 V connected in series, voltages at the connection points between battery cells 2 is an integral multiple of the cell voltage and thus increases gradually from the negative end to the positive end. The voltages at the intermediate connection points at which battery cells 2 are connected in series thus increase gradually. Battery unit 1 illustrated in FIG. 1 includes the intermediate connection points having different voltages as different-voltage terminals 11 and is connected to heater 5 of SCP 3 via switching elements 10. Different-voltage terminals 11 are provided in order to adjust the voltage to be supplied to heater 5 of SCP 3. The voltage of battery unit 1 changes between the fully charged state and the fully discharged state. For example, the lithium-ion secondary battery has a voltage of 4.2 V when fully charged and a voltage of 2.8 V when fully discharged. for example. The total voltage of battery unit 1 in which 10 battery cells 2 are connected in series changes between 28 V and 42 V. The total voltage of battery unit 1 in which 14 battery cells 2 are connected in series changes between 39.2 V and 58.8 V.

In battery unit 1, different-voltage terminals 11 corresponding to different numbers of battery cells 2 connected in series are provided in order to supply a voltage within a predetermined range from battery cells 2 having variable voltages to heater 5 of SCP 3 via switching element 10. When the voltage of battery cell 2 drops, switching element 10 is connected to different-voltage terminal 11 corresponding to an increased number of battery cells 2 connected in series to supply electric power to heater 5 of SCP 3. When the voltage of battery cell 2 rises, switching element 10 is connected to different-voltage terminal 11 corresponding to a reduced number of battery cells 2 connected in series. The voltage to be supplied to heater 5 of SCP 3 is thus adjusted to be within the predetermined range.

Battery unit 1 illustrated in FIG. 1 includes first to third different-voltage terminals 11*a*, 11*b*, and 11*c*. In the state where the voltage of battery cell 2 changes, battery unit 1 outputs a voltage within the predetermined range to SCP 3 by switching different-voltage terminal 11 to be connected to SCP 3. For example, a fuse of the surface mountable type, "SFK 3045x", which is SCP 3 manufactured by Dexerials Corporation, has a supply voltage range from 22.3 V to 31.5 V. In this SCP 3, when first to third different-voltage terminals 11a, 11b, and 11c described below are connected to SCP 3 via switching elements 10, fuse element 4 can be fusion-cut.

First different-voltage terminal 11a is connected to SCP 3 when the cell voltage changes between 3.2 V and 4.35 V. In this connection, the voltage output from seven battery cells 2 connected in series ranges from 22.4 V to 30.45 V.

Second different-voltage terminal 11b is connected to SCP 3 when the cell voltage changes between 2.5 V and 3.5 V. In this connection, the voltage output from nine battery cells 2 connected in series ranges from 22.5 V to 31.5 V.

Third different-voltage terminal 11c is connected to SCP 3 when the cell voltage changes between 1.9 V and 2.6 V. In this connection, the voltage output from 12 battery cells 2 connected in series ranges from 22.8 V to 31.2 V.

Switch 6

Switch 6 includes switching elements 10 connected to different-voltage terminals 11. Power supply 100 illustrated in FIG. 1 includes first to third switching elements 10a, 10b, and 10c connected to first to third different-voltage terminals 11a, 11b, 11c. Switch 6 connects each of different-voltage terminals 11 to SCP 3, and therefore, includes the same number of switching elements 10 as different-voltage terminals 11. In power supply 100 illustrated in FIG. 1, battery unit 1 includes three different-voltage terminals 11, and thus, three switching elements 10 are used. In a power supply equipped with a battery unit including two different-voltage terminals, the different-voltage terminals are connected to the SCP via two switching elements. In a power supply including four or more different-voltage terminals, the different-voltage terminals are connected to the SCP via four or more switching elements.

First to third switching elements 10a, 10b, and 10c are preferably employ FETs. In power supply 100 illustrated in FIG. 1, each of switching elements 10 is an n-channel FETs and has a drain connected to SCP 3 via diode 12, a source connected to battery unit 1, and a gate connected to control circuit 7. In power supply 100 described above, switching element 10 is an n-channel FET, but all other semiconductor switching elements that can be turned on an off such as a p-channel FET and a bipolar transistor may be used as the switching elements.

Diode 12 is connected in series to switching element 10 of switch 6 illustrated in FIG. 1. Diode 12 is connected in a direction in which a current flows in switching element 10 upon being turned on. Diode 12 connected to switching element 10 passes a current in the direction of switching element 10, that is, from the drain to the source of the n-channel FET illustrated in FIG. 1 while blocking an electric current flowing in the reversed direction. Therefore, when two or more FETs are turned on, heater 5 of SCP 3 is energized with the electric power supplied through only the FET connected to different-voltage terminal 11 having the highest voltage.

In power supply 100 illustrated in FIG. 1, for example, when the cell voltage of battery unit 1 ranges from 3.2 V to 4.35 V, first switching element 10a is turned on. When the cell voltage ranges from 2.5 V to 3.5 V, second switching element 10b is turned on. When the cell voltage ranges from 1.9 V to 2.6 V, third switching element 10c is turned on. In this power supply 100, when the cell voltage of battery unit 1 is 3.3 V, first switching element 10a and second switching element 10b are turned on, and an electric current from second switching element 10b passes through diode 12, but an electric current from first switching element 10a is blocked by diode 12. When the cell voltage of battery unit 1 is 2.5 V, second switching element 10b and third switching element 10c are tuned on, and in this state, in the electric current flowing from battery unit 1 to SCP 3, the electric current from third switching element 10c is in a forward direction of diode 12 while the electric current from second switching element 10b is a reverse direction of diode 12. Therefore, third switching element 10c supplies the electric current from battery unit 1 to SCP 3. As described above, power supply 100 in which diode 12 is connected in series to each of switching elements 10 provides an advantage fusion-cutting fuse element 4 of SCP 3 by turning on two or more switching elements 10 and reliably supplying an electric current from battery unit 1 to SCP 3 at a borderline cell voltage for selecting switching element 10. Particularly in the entire range of the variable cell voltage, battery unit 1 reliably energizes SCP 3 so that heater 5 may heat and fusion-cut fuse element 4.

Control Circuit 7

In an abnormal state, control circuit 7 switches switching element 10 from being turned off to being turned on so that battery unit 1 energizes heater 5 of SCP 3 to fusion-cut fuse element 4. Control circuit 7 includes voltage detection circuit 8 configured to detect a voltage of battery unit 1 or battery cell 2 and selection circuit 9 configured to select, according to the voltage detected by voltage detection circuit 8, switching element 10 to be turned on. In the abnormal state, selection circuit 9 selects switching element 10 to be turned on, and connects battery unit 1 to heater 5 via switching element 10 which is turned on so as to fusion cut fuse element 4. Control circuit 7 selects switching element 10 according to the voltage of battery cell 2 so that a voltage within a predetermined range is supplied from battery unit 1 to SCP 3.

The present invention does not particularly limit the abnormal state; examples of the abnormal state include a state where the electric current from battery unit 1 is interrupted to achieve safety or a state where battery unit 1 is protected, and in this state, fuse element 4 of SCP 3 connected to the output end of battery unit 1 is fusion-cut to interrupt the electric current. Specifically, control circuit 7 determines, as the abnormal state, a state where the total voltage of battery unit 1 or the voltage of battery cell 2 is over the maximum threshold voltage or below the minimum threshold voltage, a state where battery unit 1 or battery cell 2 is overcharged or over-discharged, a state where the electric current from battery unit 1 or battery cell 2 is over the maximum threshold current, or a state where the temperature of battery unit 1 or battery cell 2 is over the highest threshold temperature or below the lowest threshold temperature, for example. In the present invention, since the abnormal state is not limited, other various states in which the safety of the power supply is reduced may be determined as the abnormal state.

Control circuit 7 includes detector 16 configured to detect an abnormal state. Detector 16 detects an abnormal state and switches switching element 10 from turning off the switching element to turning on the switching element to fusion-cut fuse element 4 of SCP 3. In control circuit 7, in the abnormal state, voltage detection circuit 8 detects a voltage of battery cell 2, and selection circuit 9 selects switching element 10 to be switched from turning off the switching element to turning on the switching element. Control circuit 7 illustrated in FIG. 1 includes, as detector 16: an analog front end (AFE) 13 configured to detect a voltage, an electric current, or a temperature, etc., of battery unit 1 and each battery cell 2, converts the detected voltage, electric current, temperature, etc., into digital signals, and outputs the digital signals; a microprocessor unit (MPU) 14 configured to process the digital signals output from AFE 13; and overcharge detector 15 configured to detect the voltage of battery unit 1 and detect overcharging.

Analog front end (AFE) 13 includes voltage detection circuit 8 configured to detect the voltage of each battery cell 2. Microprocessor unit (MPU) 14 includes voltage detection circuit 8 configured to detect the total voltage of battery unit 1. Detector 16 may determine an abnormality by comparing the cell voltage of battery cell 2 detected by AFE 13 and the total voltage of battery unit 1 detected by MPU 14 to threshold values. Furthermore, detector 16 may detect the temperature of battery unit 1 or battery cell 2, compare the detected temperature to a threshold value, and determine the abnormal state. Detector 16 illustrated in FIG. 1 includes temperature sensor 17 and detects the temperature of battery unit 1 or battery cell 2 via temperature sensor 17.

MPU 14 is configured to calculate the remaining capacity of battery unit 1, battery cell 2, or the like by calculating the digital signals input from AFE 13, determine an abnormal state by comparing the remaining capacity, the detected voltage, or the like with the threshold value. In a state where the abnormal state is determined, MPU 14 outputs an ON-voltage to the gate of switching element 10. In power supply 100 illustrated in FIG. 1, switching element 10 employs an n-channel FET and has a drain connected to heater 5 of SCP 3 via diode 12, a source connected to battery unit 1, and a gate connected to MPU 14. Therefore, MPU 14 switches switching element 10 from turning off the switching element to turning on the switching element by inputting, to the gate, a voltage at which the gate voltage relative to the source becomes an ON voltage.

MPU 14 includes selection circuit 9 configured to select at least one of first, second, and third switching elements 10*a*, 10*b*, and 10*c* according to the cell voltage of battery unit 1 and switch the selected switching element from turning off the switching element to turning on the switching element. For example, when the cell voltage ranges from 3.2 V to 4.35 V, selection circuit 9 switches first switching element 10*a* from turning off the switching element to turning on the switching element. When the cell voltage ranges from 2.5 V to 3.5 V, selection circuit 9 switches second switching element 10*b* from turning off the switching element to turning on the switching element. When the cell voltage ranges from 1.9 V to 2.6 V, selection circuit 9 switches third switching element 10*c* from turning off the switching element to turning on the switching element. In the abnormal state, in order to be able to turn on at least one of switching elements 10, selection circuit 9 turns on both first switching element 10*a* and second switching element 10*b* at the timing of switching from first switching element 10*a* to second switching element 10*b*, switching element 10 to be turned on as a result of a gradual decreasing of the cell voltage; thus, selection circuit 9 turns on at least one of switching elements 10 without fail in the abnormal state. Power supply 100 described above provides an advantageous effect to interrupt an electric current at SCP 3 by turning on at least one of switching elements 10 without fail in the abnormal state. Since each of switching elements 10 is connected in series to diode 12, two or more switching elements 10 are turned on and two or more different-voltage terminals 11 are connected to heater 5 of SCP 3 via two or more switching elements 10 that have been turned on. However, in this state, only one different-voltage terminal 11 supplies electric power to SCP 3. When two or more switching elements 10 are turned on, two or more switching elements 10 connect the positive end and the negative end of battery cells 2, but diodes 12 interrupt discharge currents flowing from battery cells 2 and thus prevent a short-circuit current from flowing.

In power supply 100 illustrated in FIG. 1, in addition to MPU 14, overcharge detector 15 also detects overcharging of battery unit 1 to interrupt an electric current at SCP 3. Overcharge detector 15 is configured to detect the total voltage of battery unit 1 and switch first switching element 10*a* from turning off the switching element to turning on the switching element. Since overcharge detector 15 detects overcharging of battery unit 1, the cell voltage is high in this state, and overcharge detector 15 switches first switching element 10*a* from turning off the switching element to turning on the switching element. Therefore, first switching element 10*a* is switched from turning off the switching element to turning on the switching element by receiving, at the gate, the ON voltage from each of MPU 14 and overcharge detector 15. Power supply 100 described above in which first switching element 10*a* is switched from turning off the switching element to turning on the switching element according to both MPU 14 and overcharge detector 15 provides an advantageous effect to interrupt a charge current at SCP 3 by overcharge detector 15 switching first switching element 10*a* from turning off the switching element to turning on the switching element even if AFE 13, MPU 14, or the like is not operating properly.

Furthermore, in power supply 100 illustrated in FIG. 1, discharging switching element 19 configured to interrupt a discharge current and charging switching element 18 configure to interrupt a charge current are connected in series to the output end of battery unit 1, and turning on and off of discharging switching element 19 and charging switching element 18 is controlled based on AFE 13. When the detected voltage of battery unit 1 or battery cell 2 is lower than the minimum voltage, AFE 13 causes a discharge current to be interrupted by switching discharging switching element 19 from turning on the switching element to turning off the switching element. When the detected voltage of battery unit 1 or battery cell 2 is higher than the maximum voltage, AFE 13 causes a charge current to be interrupted by switching charging switching element 18 from turning on the switching element to turning off the switching element.

INDUSTRIAL APPLICABILITY

A power supply equipped with a battery unit according to the present invention particularly includes a self-control protector (SCP) at an output end of a battery unit, and favorably useable as a power supply in which an electric current is interrupted at the SCP in the event of malfunction.

REFERENCE SIGNS LIST

- 100 power supply
- 1 battery unit
- 2 battery cell
- 3 SCP
- 4 fuse element
- 5 heater
- 6 switch
- 7 control circuit
- 8 voltage detection circuit
- 9 selection circuit
- 10 switching element
- 10*a* first switching element
- 10*b* second switching element
- 10*c* third switching element

11 different-voltage terminal
11*a* first different-voltage terminal
11*b* second different-voltage terminal
11*c* third different-voltage terminal
12 diode
13 AFE
14 MPU
15 overcharge detector
16 detector
17 temperature sensor
18 charging switching element
19 discharging switching element

The invention claimed is:

1. A power supply comprising:
a battery unit;
a self-control protector (SCP) connected in series to the battery unit, the SCP being configured to interrupt charge and discharge currents in an abnormal state;
a switch configured to connect the SCP to the battery unit; and
a control circuit configured to control turning on and off of the switch, wherein
the battery unit includes a plurality of battery cells connected in series to one another,
the SCP includes:
a fuse element connected in series to an output end of the battery unit; and
a heater connected to the battery unit, the heater being configured to generate heat by Joule heating to fusion-cut the fuse element,
the switch includes a plurality of switching elements, each of the plurality of switching elements having one terminal connected to the heater and another terminal connected to a corresponding one of different-voltage terminals of the battery unit, the different-voltage terminals having different voltages appearing thereon,
the control circuit includes:
a voltage detection circuit configured to detect a voltage of the battery unit or one of the plurality of battery cells; and
a selection circuit configured to select, according to the voltage detected by the voltage detection circuit, a switching element out of the plurality of switching elements which is to be turned on,
the selection circuit is configured to, in the abnormal state:
select the switching element to be turned on; and
connect the switching element which is turned on to connect the battery unit to the heater cause so as to fusion-cut the fuse element.

2. The power supply according to claim 1, wherein the control circuit includes a detector configured to detect the abnormal state, the control circuit being configured to turn on the switching element to fusion-cut the fuse element when the detector detects the abnormal state.

3. The power supply according to claim 2, wherein
the detector includes:
an analog front end (AFE) configured to detect voltages of the plurality of battery cells; and
a microprocessor unit (MPU) configured to detect a total voltage of the battery unit, and
the detector is configured to determine an abnormality by comparing, with threshold values, the voltages of the plurality of battery cells detected by the AFE and the total voltage of the battery unit detected by the MPU.

4. The power supply according to claim 2, wherein
the detector includes an overcharge detector configured to detect overcharging of the battery unit, and
the overcharge detector is configured to detect the overcharging of the battery unit to fusion-cut the fuse element of the SCP.

5. The power supply according to claim 2, wherein the detector is configured to:
detect a temperature of the battery unit or the plurality of battery cells; and
determine the abnormal state by comparing the temperature detected with a threshold value.

6. The power supply according to claim 1, further comprising diodes, each of the diodes being connected in series to a corresponding one of the plurality of switching elements in a direction in which a current flowing in the corresponding one of the switching elements.

7. The power supply according to claim 1, wherein the plurality of switching elements are filed-effect transistors (FETs).

* * * * *